United States Patent [19]
Marks et al.

[11] Patent Number: 5,818,462
[45] Date of Patent: Oct. 6, 1998

[54] METHOD AND APPARATUS FOR PRODUCING COMPLEX ANIMATION FROM SIMPLER ANIMATED SEQUENCES

[75] Inventors: Joseph William Marks, Belmont, Mass.; John Thomas Ngo, Sunnyvale, Calif.; Andrew W. Shuman, Seattle, Wash.

[73] Assignee: Digital Equipment Corporation, Maynard, Mass.

[21] Appl. No.: 670,385

[22] Filed: Jun. 25, 1996

Related U.S. Application Data

[63] Continuation of Ser. No. 269,741, Jul. 1, 1994, abandoned.

[51] Int. Cl.$^6$ .................................................. G06T 13/00
[52] U.S. Cl. ........................... 345/473; 345/474; 345/328
[58] Field of Search ...................... 395/135, 806, 395/807, 173, 174, 175, 328, 951; 345/122, 121

[56] References Cited

U.S. PATENT DOCUMENTS

| | | | |
|---|---|---|---|
| 5,101,364 | 3/1992 | Davenport et al. | 395/152 |
| 5,261,041 | 11/1993 | Susman | 395/152 |
| 5,267,154 | 11/1993 | Tokeuchi | 364/419.2 |
| 5,325,475 | 6/1994 | Poggio et al. | 395/133 |
| 5,353,391 | 10/1994 | Cohen et al. | 395/133 |
| 5,483,630 | 1/1996 | Unuma et al. | 395/175 |
| 5,506,949 | 4/1996 | Perrin | 395/173 |

OTHER PUBLICATIONS

Kunii et al., "Dynamic Analysis–Based Human Animation", CGI 1990, pp. 3–15.

Computer Graphics: Principles & Practice, 2d Ed., Foley, van Dam, Feiner, & Hughes, ©1990, Addison–Wesley Publishing, Inc., 0–201–12110–7, Chapter 21, pp. 1057–1081.

"Making Them Move Mechanics, Control, and Animation of Articulated Figures" Morgan Kaufmann Publishers, Inc., © 1991, Chapter 2, Composition of Realistic Animation Sequences for Multiple Human Figures, Author: Tom Calvert, pp. 35–50.

"Making Them Move Mechanices, Control, and Animation of Articulated Figures" Morgan Kaufmann Publishers, Inc., © 1991, Chapter 3, Animation from Instructions, Authors: Badler, et al, pp. 51–93.

"Spacetime Constraints," Witkin, et al, Computer Graphics, vol. 22, No. 4, Aug. 1988, pp. 159–168.

"Interactive Spacetime Control for Animation," Auther: Michael F. Cohen, Computer Graphics, 26, 2, Jul. 1992, pp. 293–302.

*Primary Examiner*—Joseph H. Feild
*Assistant Examiner*—Stephen Hong
*Attorney, Agent, or Firm*—Clayton L. Satow; Michael A. Rodriguez; Ronald C. Hudgens

[57] ABSTRACT

A graphical figure is defined. A library of simple tasks is created using trial stimulus/response combinations. A hill climbing algorithm is employed to find a stimulus/response combination that accomplishes an optimum result for each task. An animation editor facilitates the creation of composite animated sequences by causing the retrieving and displaying of a first simple task, controlling the length of time the first simple task is displayed and by causing the retrieving and displaying of additional simple tasks and controlling the length of time the additional simple tasks are displayed.

25 Claims, 8 Drawing Sheets

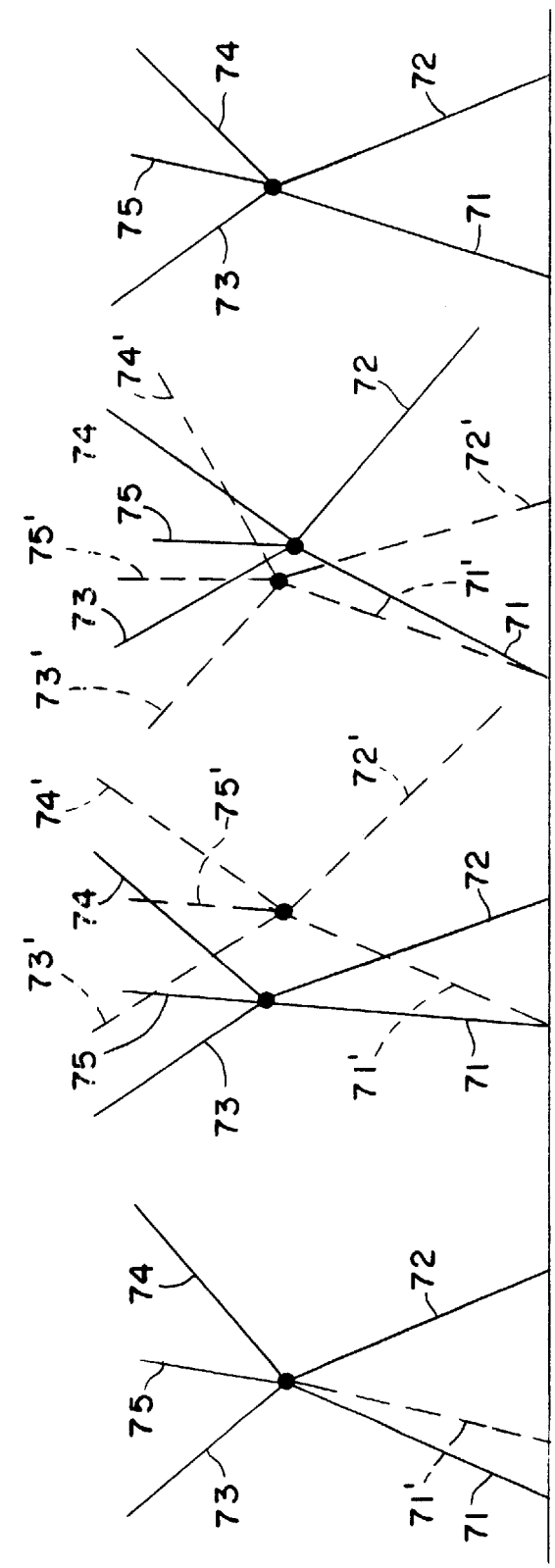

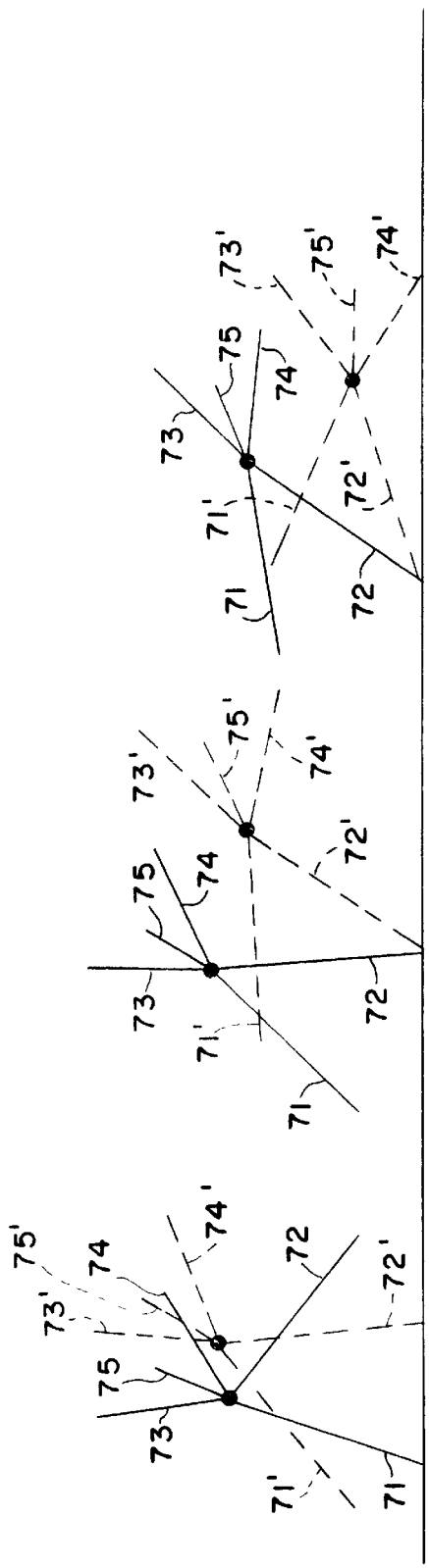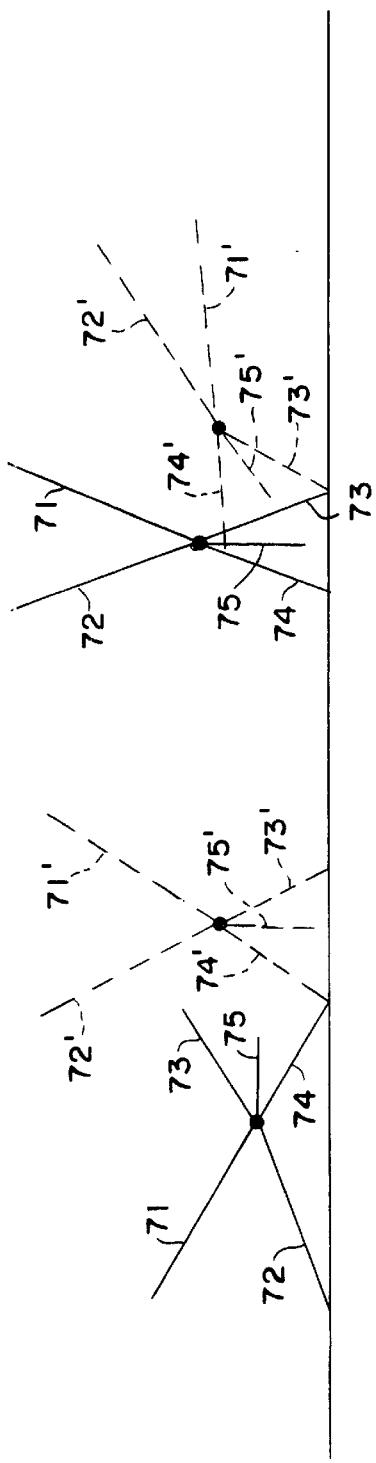

METHOD AND APPARATUS FOR PRODUCING COMPLEX ANIMATION FROM SIMPLER ANIMATED SEQUENCES

This application is a continuation of application Ser. No. 08/269,741, filed Jul. 1, 1994 now abandoned.

BACKGROUND OF THE INVENTION

The present invention is related to the field of computer created animation.

The creation of animation, whether in the form of motion pictures or electronically stored animated images (stored on media such as videocassettes and disks) has traditionally been done by a laborious process called key framing. In key framing, a sequence of high level sketches, or "storyboard" is laid out. If the animated feature is to have sound, an accompanying soundtrack is created. Next, certain "key frames" are drawn. Key frames are frames in which the entities being animated are at extreme positions (positions from which they change the direction of movement, or stop moving) or characteristic positions (positions which are of particular importance to the animated sequence). Intermediate frames (that is the frames between the key frames) are then created, typically by hand, in a process known as "inbetweening". This very tedious, manual process was developed in the 1930's and is still used today.

When human animators do "inbetweening", they are normally able to make the animated figure behave in a realistic manner. In many instances, they have observed a motion in the past, or know what type of motion will appear realistic to them and will therefore appear realistic to other human viewers.

Additionally, human animators may watch a live person or animal perform the action that they are animating, often aided by slow motion or by sophisticated video recording or photography techniques.

Unfortunately, computers used in creating animation are not able to "learn" by observation, nor do they "know" what actions will appear realistic to human viewers. Therefore, they often create animated sequences that do not appear realistic, such as an animated sequence that contains motion which is inconsistent with laws of gravity and Newtonian laws of motion, or an animated sequence that contains movements that are not physically realistic; for example, an animated figure may move in a manner not possible for an actual being.

In order to allow computers to create more realistic appearing animation, some computer animation techniques impose constraints on the movement so that the movements are physically possible, and consistent with Newtonian laws of motion. Ensuring that movements are physically possible is accomplished by creating an animated figure (often referred to as a "creature") consisting of rods, connected by hinges. The animated figure is given mechanical constraints, such as the amount and direction that each hinge can rotate; the mechanical constraints are consistent with the physical constraints of a corresponding joint (for example an elbow, hip, or knee) in a live human or animal. In addition to the mechanical constraints, the animated figure is given characteristics such as mass. The figure can then be made to move by applying forces, typically in the form of torques about the hinges, consistent with the type and amount of force that can be exerted by the muscle system of a live human or animal.

The forces, mechanical constraints, and characteristics are substituted for variables in Newtonian equations of motion to calculate the trajectory, typically stated as x, y, and z-positions in space that each of the points of the animated figure would follow. Various combinations of forces are attempted, until a combination that results in the desired trajectory is found.

This approach creates realistic animated sequences, but has a number of restrictions. One major restriction is that the complexity of the problem solving increases dramatically with the length of the sequence and with the complexity of the animated figure.

One method that has been suggested for dealing with the complexity drawback is to divide the sequence in to a number of overlapping sub-sequences, and to develop a set of forces that results in the desired motion of each sub-sequence. However, this approach also has drawbacks.

One drawback is that both the beginning and the ending positions of the animated figure in each sub-sequence are constrained. Not only must the set of forces result in the desired trajectory, but must the set of forces must also result in the desired end position. Finding such a set of forces is much more complicated than finding a set of forces that results in the desired trajectory without regard for the ending position of the animated figure. A related drawback is that since the set of forces of each sub-sequence must result in both the desired trajectory and the desired end position of the animated figure, the future applicability of the set of forces of each sub-sequence is limited to situations in which both the desired trajectory and the ending position are identical to the desired trajectory and the ending position of the current situation. In other words, the programming of each sequence and even of each sub-sequence is highly likely to be a unique, non-reusable effort. These drawbacks seriously limit the usefulness of this known technique for creating realistic animation within commercial time and expense constraints.

It is desirable to provide an animation method and system that avoids the foregoing problems and which facilitates the creation of realistic animation.

SUMMARY OF THE INVENTION

A method performed according to the principles of the invention allows for the creation of realistic animation within commercial time and expense constraints.

A number of simple tasks, including computer instructions, which calculate the movements of an articulated figure performing animated tasks and which cause an animated figure to perform tasks on a video device, are created and stored in a computer "library". An animator retrieves a first simple task from the library and runs it, terminating its execution when the articulated figure on the video device has reached an orientation approximately coinciding with an orientation that occurs during the execution of a second simple task set of computer instructions. The animator then retrieves a second simple task from the library and executes the second simple task, thereby creating a more complicated animated task. The procedure can then be repeated, until a still more complicated task is created.

In one aspect of the invention, a first animated sequence is displayed on a video device. The displaying of the first animated sequence is terminated when a graphical figure performing the animated sequence is at a position approximately coinciding with an orientation that occurs during the execution of a second animated sequence. The second animated sequence is then displayed, thereby forming a more complex animated sequence.

BRIEF DESCRIPTION OF THE DRAWINGS

FIGS. 4a–4d, collectively referred to as FIG. 4, show a series of representations of an articulated figure on a video device performing a first simple task.

FIGS. 5a–5i, collectively referred to as FIG. 5, show a series of representations of an articulated figure on a video device performing a second simple task.

DETAILED DESCRIPTION OF A PREFERRED EMBODIMENT OF THE INVENTION

Computer System for Creating Complex Animated Tasks

Figure 1:
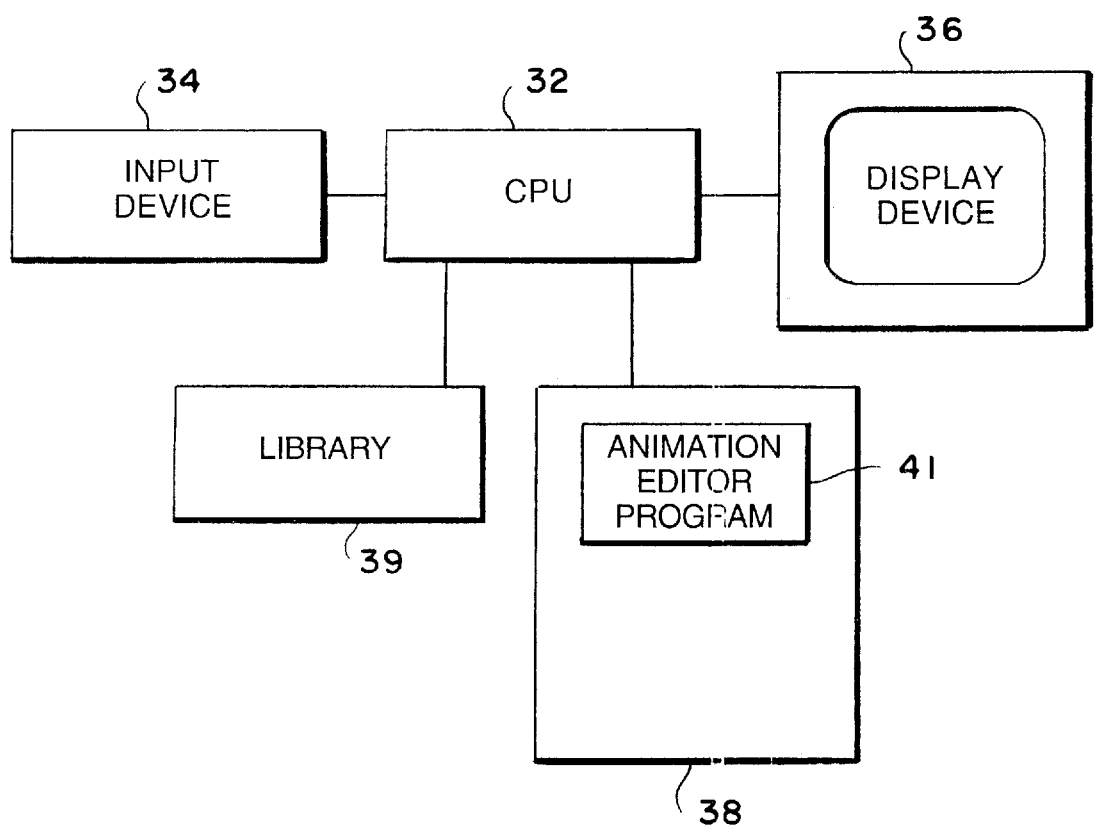
FIG. 1 is a block diagram of a system for creating animated tasks.

FIG. 1 shows a computer system constructed in accordance with the principles of the invention for creating realistic animation in a timely and commercially feasible manner.

A CPU 32 has connected to it an input device 34 and a display device 36. The input device may be a device such as keyboard, but most commonly will be a computer "mouse". The display device may be a computer monitor. Accessible to the CPU is a library 39 containing a number of simple tasks. The simple tasks may include computer instructions that, when executed by the CPU, cause an animated figure to perform the simple task on the display device. The library may physically be stored in a random access memory, or, preferably, a mass storage device such as a disk storage device. Also connected to the CPU 32 is a random access memory (RAM) 38 having stored in it an animation editor program 41. The animation editor program includes a series of computer instructions that enable the CPU to retrieve simple tasks from the library 39 and cause portions of the simple tasks to be displayed sequentially on the display device to create a more complex task and to store computer instructions that can later be retrieved by the CPU to cause the more complex task to be displayed on the display device.

Running the animation editor program 41 allows the user, employing the input device 34, to select simple tasks from the library 38 preferably by selecting them from a menu displayed on the display device 36. The animation editor program then causes the simple tasks to execute in sequence, thereby causing the corresponding animated tasks to be displayed on the display device to form a complex animated task. The complex animated task can then be stored into a file or could be defined as a new simple task and be added to the library. A process, using a computer system such as described in FIG. 4, to create complex animated tasks is described below.

Creating an Articulated Figure to Perform Animated Tasks

Figure 2:
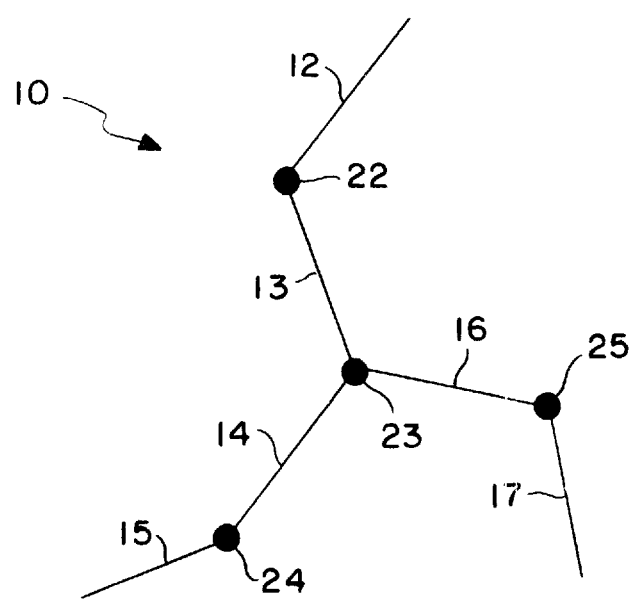
FIG. 2 is an articulated figure for performing the animated tasks.

Prior to using the system of FIG. 1 to create complex animated tasks, there are two preliminary steps. A first preliminary step may be to define a graphical FIG. 10 to perform animated sequences on a display device. One suitable form of graphical figure is an articulated figure such as shown in FIG. 2. In FIG. 2, the articulated figure includes a number of elements, including a plurality of articulated elements, for example six rigid rods 12–17, and four hinges 22–25 joining two or more of the rods. Each of the hinges is assigned characteristics that describe the permissible motion about the hinge. A typical characteristic may be a range of motion (that is, a maximum and minimum angle that the connected rods may make with each), and an amount and direction of torque that can be applied about the hinge. For example, the range of motion about hinge 25, which connects rods 14 and 15, might be similar to the range of motion about a human knee and the amount of torque might be similar to the torque that can be applied by muscles to a human knee.

Those skilled in the art will appreciate that an articulated figure, such as that shown in FIG. 2, can be made more realistic by adding more elements (such as more rods and hinges to simulate arms, shoulders, ankles, necks and heads, and the like), and by "filling in" the articulated figure with "flesh," clothing, and so forth. Additionally, it may be desirable to assign physical characteristics to the articulated figure such as a weight, and to calculate other physical characteristics, such as a center of mass of the articulated figure. Methods for assigning characteristics, such as weight, and calculating such characteristics as the center of mass are familiar to those skilled in the art.

Creation of Simple Tasks

A second preliminary step is to create the library 39 (of FIG. 1) of simple tasks.

The simple tasks may include computer instructions that specify encoded stimulus response "rules" such as IF $20 \leq \theta_a \leq 30$ AND
$40 \leq \theta_b \leq 90$ AND
$3 \leq h_{cm} \leq 5$ AND
$1 \leq v_{cm} \leq 2$ THEN apply a torque of value 5 to hinge a and
apply a torque of value −2 to hinge b (hereinafter referred to as Sample Rule 1) where $\theta_a$ and $\theta_b$ are the angles of the rods about hinges a and b, respectively, $h_{cm}$ is the height of the center of mass and $v_{cm}$ is the vertical velocity of the center of mass. The simple tasks also contain computer instructions that calculate the resulting movement of the components of the articulated figure, and that cause the resulting movement to appear on the display device. Programming techniques for calculating of the resulting movement and for causing the resulting movement to appear on a display device are familiar to those skilled in the art.

Figure 3B:
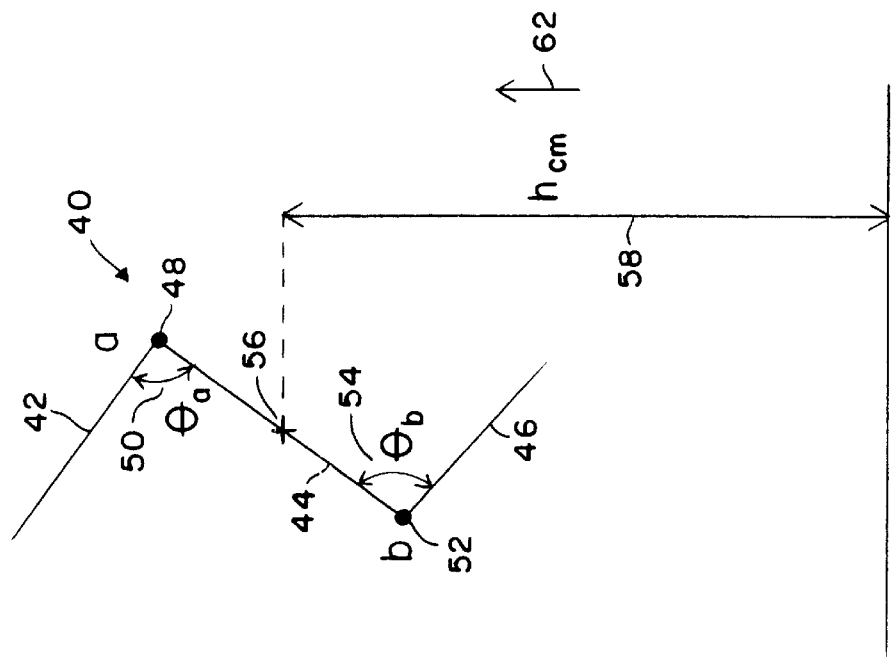
FIGS. 3a and 3b, collectively referred to as FIG. 3, are representations of an articulated figure executing a sample rule.
Figure 3A:
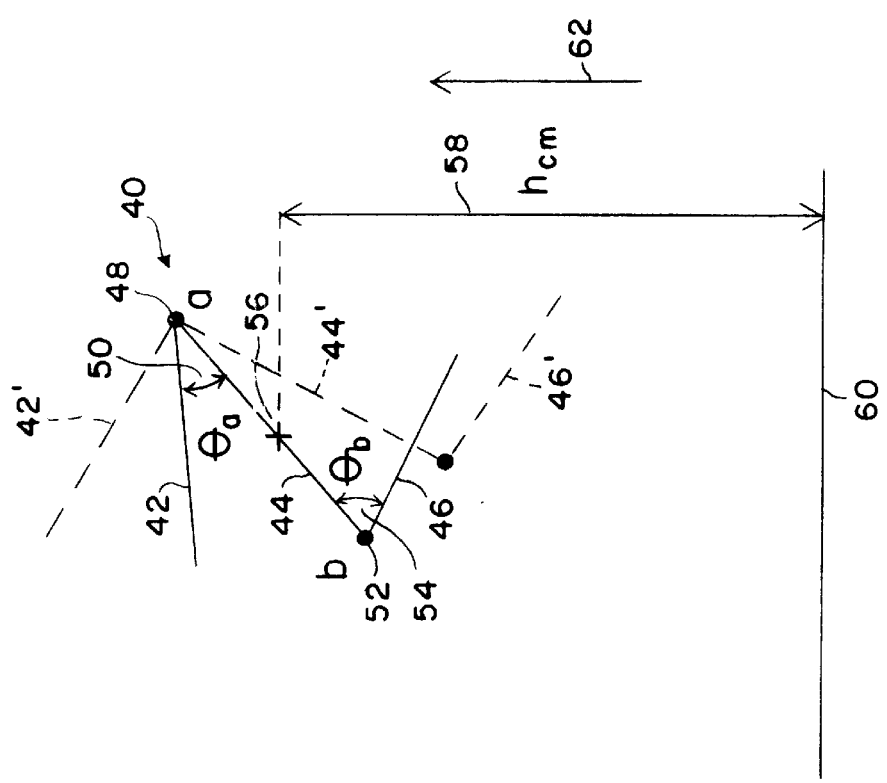

An example of an articulated figure performing Sample Rule 1 is shown in FIGS. 3a and 3b. In FIG. 3a, an articulated FIG. 40 includes three rigid rods 42, 44, and 46. Rods 42 and 44 are connected at hinge a 48 to form angle $\theta_a$ 50. Rods 44 and 46 are connected at hinge b 48 to form angle $\theta_b$ 54. The center of mass 56 of the figure is at height $h_{cm}$ 58 above a base line 60. The figure is moving with a velocity $v_{cm}$ represented by vector 62.

Assuming that angle $\theta_a$ 50 is between 20 and 30 degrees, that angle $\theta_b$ 54 is between 30 and 90 degrees, that $h_{cm}$ 58 has a value between 3 and 5, and that velocity $v_{cm}$ has a value between 1 and 2, then according to Sample Rule 1, a torque of value 5 is applied to hinge a 48, and a torque of value −2 is applied to hinge b 52. The torques cause the rods 32, 33, and 46 to rotate about the hinges 48 and 52 according to characteristics that have been assigned to those hinges, resulting in a new configuration represented by dotted lines 42', 44', and 46'. In addition other forces, such as gravity, not indicated in FIG. 3a or in Sample Rule 1, may act on the articulated FIG. 40, thereby affecting the height $h_{cm}$ 58 and the vertical velocity represented by the vector $v_{cm}$ 62, resulting in the position shown in FIG. 3b.

In FIG. 3b, the rods 42, 44, and 46 are in a configuration similar to the rods 42', 44', and 46' of FIG. 3a. The vertical velocity represented by the vector $v_{cm}$ 62 has decreased (due, for example, to some exterior force, such as gravity, not indicated in FIGS. 3a and 3b). The height $h_{cm}$ 58 may be greater than in FIG. 3a because the velocity indicated by the vector 62 is still in an upward direction. In the configuration as shown in FIG. 3b, one or more of the conditions of Sample Rule 1 may no longer be true. For example, angle $\theta_a$ 50 may no longer be between 20 and 30 degrees, angle $\theta_b$ 54 may no longer be between 40 and 90 degrees, and the upward velocity represented by the vector $v_{cm}$ may be of a value less than 1. Since these conditions are no longer true the torques indicated in Sample Rule 1 will no longer be applied, and the only motion of the articulated FIG. 40 would be caused by outside forces, such as gravity.

An advantage of creating motions by specifying forces about hinges is that the articulated figure does not need to be in a specific spatial orientation in order for the muscle and joint activity to produce the desired task. This is a significant advantage over computer assisted animation methods that specify motions as a set of dynamic equations because dynamic equations may not produce the desired result if the articulated figure is not in the proper orientation.

However, determining which forces to apply about which hinges in order to create a desired motion is a complicated task for the animator. One of the complications may be that a simple task may have five to ten rules similar to Sample Rule 1. The different rules may produce contrary forces. For example one rule may result in a force in one direction, and another rule may result in a force in an opposite direction. Another complication is that articulated figures may have move elements than the two hinges of the articulated figure of FIGS. 3a and 3b. For example, an articulated figure for development purposes may have 10 or more hinges; an articulated figure for commercial use may have 50 or more hinges. Yet another complication may be that more factors than are used in Sample Rule 1 may be involved, such as a vertical velocity component. Still another complication may be that force is applied to an external object, such as the "ground" represented by a base line, such as the base line 60 of FIGS. 4a and 4b (allowing, for example, the articulated figure to jump or walk) or such as an object that the articulated figure may "throw". Because of these and other complications, it may be very difficult to predict the outcome of the several rules making up a simple task, or stated differently, it may be very difficult, knowing the task to be performed, to predict the correct rules for accomplishing the task.

One method of creating a simple task despite all of these complications is to assign a desired outcome, impose constraints, then to try various combinations of stimulus/response rules to find an optimal outcome relative to performance criteria. For example, a simple task may be created by trying several simple rules, such as Sample Rule 1, and trying different combinations of torques about the hinges for different values of $\theta_a$, $\theta_b$, $h_{cm}$, $v_{cm}$.

An example of a success criterion may be for the articulated figure to walk in a manner that moves the center of mass the farthest in a given amount of time. Several combinations of rules, of the type stated above, might be tried until an optimal performance relative to the success criteria is achieved. If the combination that achieves the optimal performance (that is, for example, the combination of stimuli and responses that moves the center of mass the farthest in a given amount of time) is unrealistic (such as the articulated figure walks backwards) the constraints can be modified. If the optimal performance is unrealistic, rules may be added, deleted, or modified until an optimal performance is attained.

Since trying different combinations of rules to find an optimal performance is a trial and error process, it can be very time-consuming process, even with a modern high speed computer. However, learning by trying various combinations of rules is a method that lends itself to advanced computer programming techniques which can be performed off-line (that is, the trial and error process can be performed separately from the use of the editor to developing the complex animated task).

Techniques for "Learning" a Simple Task

One of these advanced programming techniques is the so-called neural network programming technique, that has the advantage that it simulates the manner in which a human brain controls muscular activity.

Other appropriate advanced programming techniques are "hill climbing" techniques. In a hill climbing technique, a candidate combination of rules is defined and run on the computer to determine the outcome relative to the performance criteria. If the changed combination is superior to previous combinations, it is retained; if the changed combination is inferior to previous combinations, it is discarded.

One type of hill climbing technique is called stochastic hill climbing (SHC). In stochastic hill climbing, a trial combination of rules is created and evaluated to see how it performs relative to performance criteria. The trial combination is then randomly changed, or perturbed. Using the example of Sample Rule 1, random changes might include the values of $\theta_a\theta_b$, $v_{cm}$, or $h_{cm}$ at which a torque is applied, or changing the size of the torque applied to hinge a or b, or some combination of such changes. The new combination of rules (the combination after the random changes) and the old combination or rules (the combination of rules before the random changes) may then be compared to see which outcome is better relative to the performance criteria (for example, jumps higher, or walks farther in a given length of time). By continually retaining the better combination and by continually using the better combination as a base for further changes, an optimal combination can be obtained. Using computer programming terminology, a stochastic hill climbing process may be represented as:

Initialize a single candidate combination
FOR evaluation=1 TO n DO
   randomly perturb the candidate combination
   evaluate the new candidate combination
   IF the new genome is better than the old THEN
     replace the old candidate combination with the new candidate combination
   END IF
END DO
where n is the number of evaluations.

One problem with the stochastic hill climbing process is that it if the initial candidate combination is unsuitable, the search can become trapped in a local minimum, or in other words the optimal result may be a "best bad solution". As an example, it the performance criteria are to move the center of mass the farthest in a given length of time and to not fall, the articulated figure may "learn" the best method of crawling, rather than learning to walk or run.

A variation of the stochastic hill climbing technique, called stochastic population hill climbing (SPHC) lessens the likelihood that the search will become trapped in a local minimum. In an SPHC process, rather than initializing a single candidate combination of rules, a plurality (referred to as a "population") of candidate combinations of rules is defined. Each of the population of combinations is evaluated relative to the performance criteria. Each of the population of candidate combinations of rules is then randomly changed (perturbed) to create a new combination and compared, according to the performance criteria, with the corresponding candidate combination prior to being changed (the old combination). As with the SHC process, the better of the new and old combinations is retained and the other discarded. The perturbation and comparison is done for each of the population of combinations, and repeated thus resulting in a number (equal to the population) of "best" combinations. After a number, referred to as a reseed interval, of perturbations and comparisons the population is rank ordered according to the performance criteria. The bottom 50% of the population is replaced with a copy of the top 50%, and the process is repeated. In programming terminology, the SPHC process can be represented as:

Initialize population
FOR evaluation=1 TO n/p DO
    FOR each individual candidate combination DO randomly perturb the candidate combination;
        evaluate the new candidate combination;
        IF the new candidate combination is better than the old THEN
            replace the old genome with the new
    END DO
    IF evaluation=r, THEN
        rank order the population
        replace the bottom 50% with top 50%
    END IF
END DO where n is the number of evaluations, p is the population, and r is the reseed interval.

Examples of Computer Monitor Displays of Simple Tasks

FIGS. 4 and 5 show an examples of two animated tasks that may appear on computer monitor as a result of the simple task (sometimes referred to as the movement behavior) instructions being run on the computer. FIGS. 4a–4d show consecutive positions in a sequence in which an articulated figure performs a simple shuffle. The dotted lines in FIGS. 4a–4d illustrate the task of the components of an articulated FIG. 70 as they move from one position to the next. In FIG. 4a, one "leg" 71 moves to the position indicated by dotted line 71', which is the same as the position of the "leg" 71 of FIG. 4b. FIG. 4b shows one end of a "leg" 71 remaining fixed as the leg moves to the orientation indicated by dotted line 71' (as if the end of the "leg" is in contact with the ground). Similarly, "leg" 72, "arms" 73 and 74, and "neck" 75 move to the positions indicated by dotted lines 72', 73', 74', and 75' respectively resulting in the configuration of FIG. 4c. In FIG. 4c, the "leg" 72 moves to the position indicated by 72' and the other components change orientation as indicated, resulting in the configuration shown in FIG. 4d. The position of the articulated figure in FIG. 4d is identical to that in FIG. 4a, so that the repetition of the steps shown in FIG. 4a–4c results in a periodic, repetitive shuffling motion.

Figure 5F:
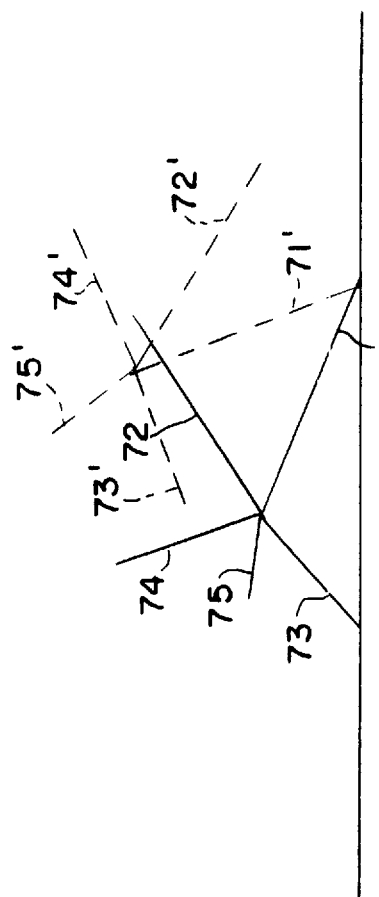
Figure 5G:
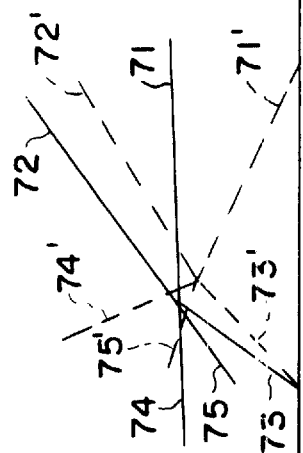
Figure 5H:
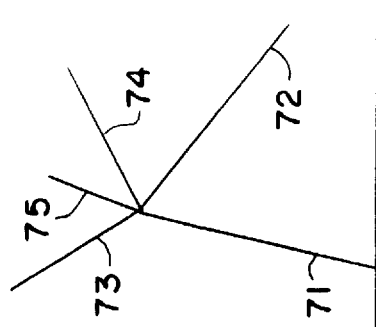
Figure 5I:
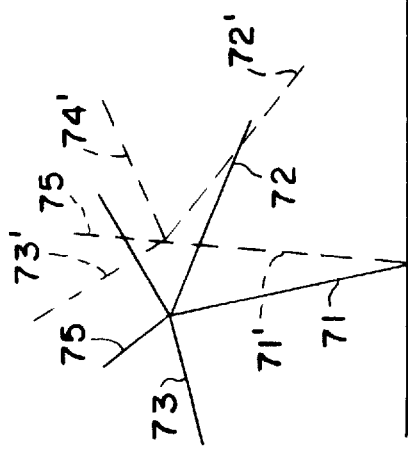

FIGS. 5a–5i show the articulated FIG. 70 performing a cartwheel. As with FIGS. 4a–4d, the components 71, 72, 73, 74, and 75 move to the positions indicated by dotted lines 71', 72', 73', 74', and 75' respectively. In FIG. 5a, the articulated figure "rocks" from "leg" 71 to "leg" 72. In FIG. 5b, the articulated figure rotates in the plane of the drawing about a point at which the free end of a "leg" 72 contacts a line 76, which represents the ground. In FIG. 5c, the articulated figure continues rotating until an "arm" 74 contacts the line 76. In FIG. 5d, the articulated figure rotates in the plane of the drawing about the point at which the free end of an arm 74 contacts the line 76 until the free end of the other arm 73 contacts the line. In FIGS. 5e and 5f, the articulated figure rotates about the point at which the free end of the arm 73 contacts the line until the free end of a leg 71 contacts the line. In FIGS. 5g and 5h, the articulated figure rotates about the point at which the free end of a leg 71 until the position of FIG. 5i (which is identical to solid lines of FIG. 5a) is reached.

In a preferred embodiment of the invention, the instructions of the simple task are structured such that the task begins with a defined orientation of the articulated figure and is repetitive. For example, in such an embodiment, when the cartwheel simple task is executed by the CPU, the articulated figure would always start from the same orientation, such as shown in FIG. 5a, and would continue to perform cartwheels until the execution of the computer instructions is terminated in a manner to be described in the discussion of FIG. 7.

Assembling the Simple Tasks into a Library

As simple tasks such as the simple tasks which result in the screen displays as described in the discussion of FIGS. 4a–4d and 5a–5i, and others, have been defined, they can be assembled into the library of simple tasks. Each of the simple tasks may include computer instructions which describe simple rules such as Sample Rule 1, and may have been developed by "learning" how to do a simple task as described above. The library may be stored as a set of computer files, one file for each simple task, in a disk storage device, as stated above in the discussion of FIG. 1. Developing each of the simple tasks and storing them as individual computer files requires that the simple tasks be computed only once, and enables the simple tasks to be developed at any convenient time, not just when the complex animated task is being developed. The library can be added to, both by calculating new simple tasks and by adding complex tasks created by the animation editor.

Assembling Complex Tasks from Simple Tasks

Figure 6:
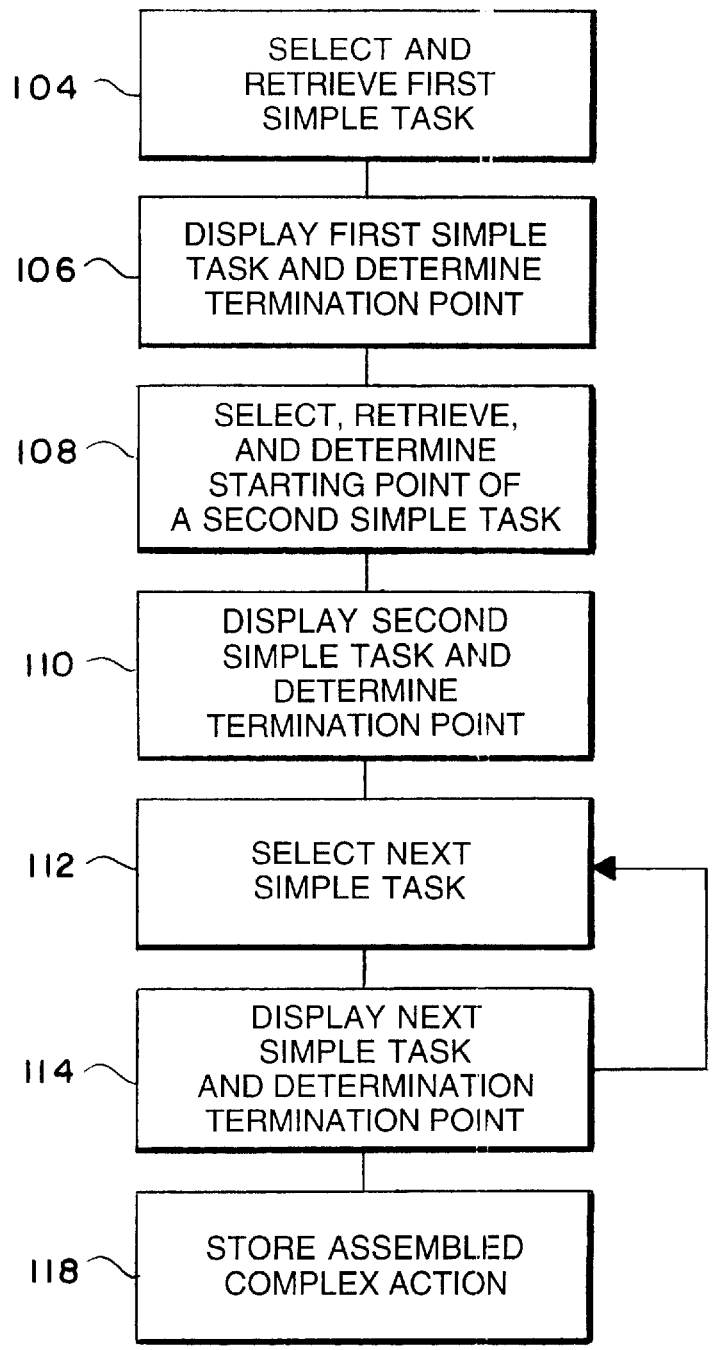
FIG. 6 is a flow diagram for created animated tasks according to the principles of the invention

FIG. 6 shows a process by which a system such as described in the discussion of FIG. 1 may assemble a complex task from a library of simple tasks. A first simple task from the library of simple tasks, for example the shuffling motion shown in FIGS. 4a–4d, may be selected and retrieved from the library at 104. The selection may be performed by a user selecting from a menu as will be described below. The retrieval may be done by the CPU reading the computer file containing the instructions which caused the first simple task to be performed, from the library 39 into the RAM 38.

Next, the first animated sequence, resulting from the execution by the CPU of the first simple task, is displayed at step 106 on an output device, such as a computer monitor. The display step may include the CPU retrieving the computer instructions from the RAM 38 and executing them, thereby causing the simple task to be performed on the display device 36. In order to provide for a smooth transition from the first simple task to a second simple task, it may therefore be necessary to terminate the execution of the first simple task at 106 so that a state parameter of the articulated figure is approximately the same as the corresponding state parameter of the articulated figure at a point during the execution of a second simple task.

There may be many parameters included in the state of an articulated figure. The parameters may include orientation, position, velocity, angular momentum, linear momentum, shape, and others. For there to be a smooth transition from the first animated sequence to the second animated sequence, at least one of the parameters must be approximately equal to the corresponding state parameter of the articulated figure at some point during the execution of the second simple task. It is not necessary that the state parameters be exactly the same. For example, if the orientation of a component of the articulated figure is slightly different, but the component is moving in the right direction, the two animated sequences may merge smoothly. On the other hand, if the component is moving in the wrong direction, the two animated sequences may not merge smoothly.

Additionally, the degree to which the other parameters must match varies. For example, for motion to appear smooth and graceful, it may be necessary for most of the parameters to match fairly closely, or the animated sequences may not merge smoothly. If the motion is rapid and spasmodic, a wide degree of variation may be tolerated.

For simplicity and clarity of explanation, the examples described below will use the orientation parameter as the parameter that is approximately equal, but it will be appreciated that other state parameters may be used.

A convenient method for terminating the execution of the first simple task with the articulated figure in an appropriate configuration is to designate a logical condition for the termination of the execution of the first simple task. One logical condition is an amount of time for a simple task to run. As previously stated, in a preferred embodiment the instructions of the simple tasks may be structured such that the starting point for each simple task is a defined orientation. In most cases, computer instructions are executed at about the same rate each time they are executed. Since the simple task begins at a defined point, and since the instruction are executed at about the same rate, executing the simple task for a defined length of time results in the articulated figure being in the same position each time is its run for that length of time. A method for designating an amount of time for the simple task to run is described below in the discussion of FIGS. 7 and 8.

Other logical conditions that could be used to designate a termination point of the first simple task are the occurrence of some event (such as the articulated figure "colliding" with some other object, or the articulated figure hitting a target with a projectile) or the existence of a relationship, such as the articulated figure having its right leg in front of its left leg.

For example, if the animator desires the second simple task to be the cartwheel shown in Figures 5a–5i, the shuffling motion can be terminated at the position of FIG. 4c, which is similar to the position of the articulated figure at FIG. 5a.

Following the selection of the termination point of the first simple task, a second simple task, such as the cartwheel shown in FIGS. 5a–5i, may be selected and retrieved at 108 from the library. The selection and retrieval of the second simple task may be done in a manner similar to the selection and retrieval of the first simple task. The starting point of the execution of the second simple tasks may also be specified. A convenient method for specifying the starting point is to specify an orientation of the articulated figure after the second simple task has been executed for a defined length of time (which may be zero, meaning the orientation of the articulated figure at the beginning of the execution of the second simple task). For reasons stated previously, specifying a defined amount of time for the simple task to execute results in a predictable orientation of the articulated figure on the display device.

The first simple task and the second simple task may then be sequentially executed by the CPU to cause a more complex animated sequence including the first and second animated sequences to be displayed at 110 on the display device. If necessary, the termination point of the first simple task and the starting point of the second simple task may be modified as in step 106 a second time, in order to provide for a smoother transition from the first simple task to the second.

When the combined first and second animated tasks appear on the monitor as designed, the termination point of the second simple task may be selected, also at 110, in a manner similar to the selection of the termination point of the first simple task at 106.

If desired, selection, retrieval, display, and termination steps, similar to steps 108 and 110 may be performed at 112 and 114 for one or more subsequent steps, until all the simple tasks which make up the complex task have been selected. So, for example, if the animator desires a shuffle to follow the cartwheel, the cartwheel could be terminated as in FIG. 5i. The assembled complex action may then be stored at 118. The complex task may be stored in the form of a computer file which includes the simple rules which make up the first simple task, the second simple task, and any additional tasks, and may also include instructions as to how long to run each of the simple tasks. The storage of the complex task may be done by the CPU 32 storing the computer file in a storage device such as the disk storage device 39 or another mass storage device not shown. When the complex task is later retrieved from the storage device, the CPU may run each of the simple tasks for the amount of time specified, thereby causing the complex action to be displayed on the screen.

In another embodiment, the complex task can include branching, in which a plurality of alternate second simple tasks are defined, and a criteria for deciding which alternate simple task is selected. Decision criteria may include one of the state parameters having a defined value or the existence of some logical condition.

Screen Display for Creating Complex Animated Tasks

Figure 7:
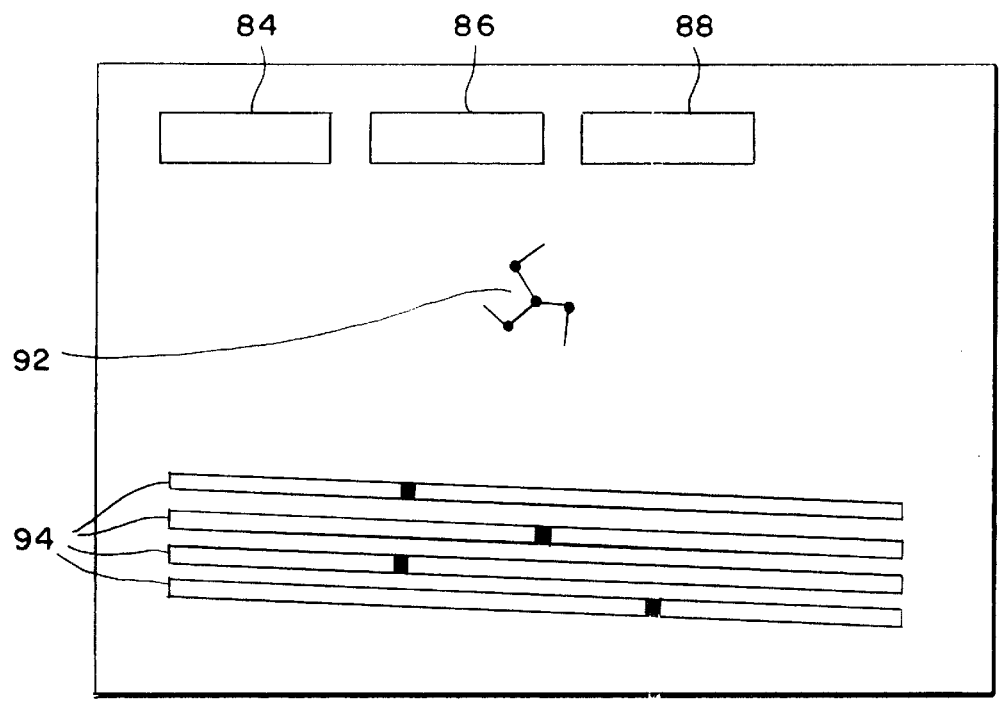
FIG. 7 is a diagram of a portion of the display on display device of FIG. 1.

An example of screen display to perform the process described in the discussion of FIG. 6 to facilitate the use of the animation editor is shown in FIG. 7. FIG. 7 shows a screen display as it may appear on the display device 36 of FIG. 1.

On the screen may be 3 pull-down menus 84, 86, and 88. The pull-down menus may be accessed by a user employing an input device 34 of FIG. 1 to move a cursor to the pull-down menu on the screen, and indicating that the user intends to select an item from that menu, typically by "clicking" an indicator button on a "mouse". The pull-down menu may then expand to cover a larger portion of the screen to display the various selections on that menu. Selection of an item from a menu may be done by moving a cursor to the item on the menu and indicating the selection, typically by clicking a button on a mouse. If the menu has expanded, moving the cursor to another part of the screen and clicking the mouse button may cause the menu to contract.

A session control pull-down menu 84 offers the user session control commands such as saving or discarding a computed complex task or quitting the editor. A task pull down menu 86 lists the simple tasks in the library of simple tasks so the user can select, as in steps 104, 108, and 112 of FIG. 6, which simple tasks to use. A display control pull-down menu 88 controls the display area 92 in which the motion of the articulated figure is shown. Included in the display control pull-down menu may be commands such as "start", "suspend" and "stop". A plurality of slider bars 94 for enabling the user to select the termination point of the simple tasks, as in steps 106, 110, and 114 of FIG. 6 may be at the bottom of the display. There may one slider bar for each task. Thus, if there are 10 slider bars, as many as 10 tasks can be combined to create the complex task.

Figure 8:
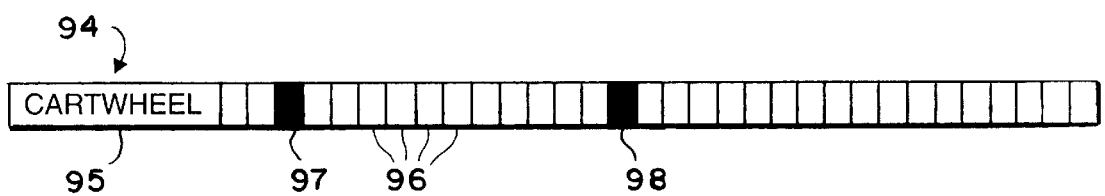
FIG. 8 is a diagram of a portion of the display of FIG. 7 in greater detail.

FIG. 8 shows a slider bar 94 in greater detail. The simple task assigned to the slider bar may appear at an end section 95 of the slider bar. The slider bar is marked with gradations 96. More gradations allow the user to control more precisely the termination point of the simple tasks; however, if there are too many gradations, the gradations may be hard to distinguish on the screen. One embodiment of the invention has 200 gradations.

The user selects the starting point and the termination point for each simple task by using the input device to move the beginning slider indicator 97 and the termination slider indicator 98. This may be done by using an input device 34 of FIG. 1 to position a cursor on the slider indicator. If the input device is a mouse, the slider indicator may be moved by holding down a button on the mouse, moving the cursor to the desired position, and releasing the button. The farther to the right the slider indicator is placed, for example, the longer the simple task will execute. Thus, to terminate the execution of a simple task sooner, the user moves the slider bar to the left; to terminate later, the user moves the slider bar to the right. In placing the slider bar indicator the user is actually designating an amount of time for the simple task to execute. However, it is unnecessary for the user to actually know the exact amount of time that the task executes. Computer instructions in the animation editor program 42 of FIG. 1 convert a slider bar indicator position to an amount of time and include in the computer file containing the complex task the amount of time designated by the user for each simple task. Method for performing this conversion and for including an amount of time in computer file are known to those skilled in the art.

It will also be recognized that the screen display shown in FIGS. 7 and 8 is but one of many different types of screen displays that can be used to perform the process described in the discussion of FIG. 6. Other types of screen displays and other forms of command input (such as command lines) could be accommodated by the invention.

To accommodate branching, alternate second simple tasks could be assigned to different slider bars, and an item in one of the pull-down menus, such as the session control pull-down menu 84, could be used to cause a dialog box to appear on the screen display to allow the user to input the criteria for determining which of the alternate second simple tasks to branch to. In a simple embodiment, the user could simply specify a line of code to be inserted into the simple task, but in another embodiment, the animation editor 41 of FIG. 1 could contain instructions which insert the appropriate instructions into the complex task, based on the user's selecting options from a menu.

While specific implementations of the invention having been described, those familiar with the art will appreciate that the invention may be practiced in other ways while still remaining within the scope and spirit of the appended claims.

We claim:

1. A method for producing animation of a graphical figure on a display device comprising:

selecting a first and a second distinct animated sequences from a library of animated sequences, each of the selected animated sequences being a sequence of positions of the graphical figure, which, when displayed, produces animation of the graphical figure;

selecting a termination point from any one of the positions in the first animated sequence and a starting point from any one of the positions in the second animated sequence so that a value of a state parameter of the graphical figure at the termination point is approximately equal to a value of a corresponding state parameter of the graphical figure at the starting point;

displaying the first animated sequence on the display device;

terminating the displaying of the first animated sequence at the termination point; and displaying the second animated sequence on the display device starting from the starting point, the displaying of the second animated sequence immediately succeeding the displaying of the first animated sequence to produce uninterrupted animation of the graphical figure.

2. A method as in claim 1, further comprising:

selecting a start position from any one of the positions before or at the termination point in the first animated sequence; and wherein the displaying of the first animated sequence starts at the selected start position.

3. A method as in claim 1, further comprising:

storing the uninterrupted animation in the library of animated sequences as another distinct animated sequence.

4. A method as claimed in claim 1, wherein said state parameter of the graphical figure at the termination point is an orientation of said graphical figure.

5. A method as claimed in claim 1, wherein said selecting a termination point in said first animated sequence comprises the step of specifying a logical condition, an occurrence of which causes said terminating.

6. A method as claimed in claim 5, wherein said specifying step comprises the step of indicating a length of time after which said terminating will occur.

7. A method as claimed in claim 1, wherein said displaying of said first animated sequence includes:

retrieving a first set of computer instructions from said library;

executing said first set of computer instructions to cause said displaying of said first animated sequence; and wherein said displaying of said second animated sequence includes:

retrieving a second set of computer instructions from said library; and executing said second set of computer instructions to cause said displaying of said second animated sequence.

8. A method as claimed in claim 7, wherein said library is preformed by a process including the steps of:

creating a first test set comprising a plurality of computer instructions, said computer instructions specifying an action to be performed in response to an existence of a stated relationship of two elements of an articulated figure;

first executing, by a CPU, of said first test set;

first measuring of a first result of said first executing against a predefined fitness criterion;

modifying one of said computer instructions in said first test set, creating a revised test set;

second executing, by said CPU, of said revised test set with a modified computer instruction;

second measuring of a second result of said second executing against said predefined fitness criterion;

comparing said first result with said second result; and discarding one of either said first test set or said revised test set.

9. A method as claimed in claim 7, wherein said library is preformed by a process including the steps of:

creating a plurality of original test sets, each test set comprising a plurality of computer instructions, each original test set of computer instructions specifying an action to be performed in response to an existence of a stated relationship of two elements of an articulated figure;

first executing, by a CPU, of each original test set;

first measuring a first result of said first executing of each original test set against a predefined fitness criterion;

modifying one of the computer instructions in one of said plurality of original test sets, creating a revised test set;

second executing, by said CPU, of said revised test set;

second measuring of a second result of said second executing of said revised test set against said predefined fitness criterion;

comparing said first result with said second result;

discarding one of either said original test set or said revised test set and retaining the other of said original test set or said revised test set;

repeating said modifying, said second executing, said second measuring, said comparing, said discarding, and said retaining a predefined number of times so as create a plurality of retained test sets; and replacing a first portion of said plurality of retained test sets with a copy of a second portion of said plurality of retained test sets.

10. A method as claimed in claim 7, wherein the terminating of the first animated sequence is performed by specifying a length of time to display the first animated sequence.

11. A method as claimed in claim 10, wherein the specifying a length of time to display the first animated sequence is performed by specifying a length of time to execute the first set of computer instructions.

12. A method as claimed in claim 7, further comprising the step of storing a computer file containing:

the first set of computer instructions;

an indication of a logical condition for terminating an execution of said first set of computer instructions; and the second set of computer instructions.

13. A method as claimed in claim 1, wherein said graphical figure of said first and second animated sequences comprises an articulated figure.

14. A method as claimed in claim 13, wherein the articulated figure comprises rods connected by hinges.

15. A method as claimed in claim 14, wherein the uninterrupted animation of the graphical figure comprises one of said rods rotating about one of said hinges according to a defined range of motion.

16. A method as claimed in claim 15, wherein the rotating is proportional to a simulated torque applied about the hinge to the two rods.

17. A method as claimed in claim 1, wherein said step of selecting distinct animated sequences selects a plurality of second animated sequences, and wherein said terminating step occurs when said graphical figure performing said first animated sequence has reached a first state approximately coinciding with a corresponding state of said graphical figure occurring at a point during an execution of one of said plurality of second animated sequences, said method further comprising the step of providing a procedure for selecting one of said plurality of second animated sequences.

18. An apparatus for producing animation of a graphical figure on a display device comprising:

means for selecting a first and a second distinct animated sequences from a library of animated sequences, each of the selected animated sequences being a sequence of positions of the graphical figure, which, when displayed, produces animation of the graphical figure;

means for selecting a termination point from any one of the positions in the first animated sequence and a starting point from any one of the positions in the second animated sequence so that a value of a state parameter of the graphical figure at the termination point is approximately equal to a value of a corresponding state parameter of the graphical figure at the starting point;

means for displaying the first animated sequence on the display device;

means for terminating the displaying of the first animated sequence at the termination point; and means for displaying the second animated sequence on the display device starting from the starting point, the displaying of the second animated sequence immediately succeeding the displaying of the first animated sequence to produce uninterrupted animation of the graphical figure.

19. Apparatus as in claim 18, wherein the terminating means comprises means for specifying a length of time to display the first animated sequence.

20. Apparatus as claimed in claim 19, wherein said means for specifying a length of time to display said first animated sequence further comprises means for specifying a length of time to execute a first set of computer instructions.

21. Apparatus as claimed in claim 18, further comprising:

a CPU for executing computer instructions; and wherein said library includes a plurality of sets of computer instructions for executing by said CPU to cause said first animated sequence to appear on said display device.

22. A computer system for creating animated sequences, comprising:

a storage device, for storing a plurality of sets of computer instructions;

a display device;

a CPU coupling the display device and the storage device for retrieving a first set of computer instructions from the storage device and executing the first set of computer instructions to cause a first animated sequence of positions of a graphical figure to appear on the display device and for retrieving a second set of computer instructions from the storage device and executing the second set of computer instructions to cause a second animated sequence of positions of the graphical figure to appear on the display device;

an input device for selecting a termination point from any one of the positions of the first animated sequence and a starting point from any one of the positions of the second animated sequence so that a value of a state parameter of the graphical figure at the termination point is approximately equal to a value of a corresponding state parameter of the graphical figure at the starting point, said CPU terminating said execution of said first set of computer instructions at the termination point and beginning said execution of said second set of computer instructions at the starting point to produce uninterrupted animation of the graphical figure; and memory means storing an animation editor program containing computer instructions for execution by the CPU to retrieve and execute the first and second set of computer instructions.

23. The computer system as claimed in claim 22, wherein said input device includes means for controlling an indicator on said display device for terminating said execution of said first set of computer instructions by specifying a length of time to execute said first set of computer instructions.

24. The computer system as claimed in claim 23, wherein the input means includes means for controlling a plurality of indicators on the display device, each indicator for terminating the execution of a corresponding set of computer instructions by specifying a length of time to execute the corresponding set of computer instructions.

25. The computer system as claimed in claim 22, wherein said CPU includes means for storing in said storage device a computer file including said first set of computer instructions, said second set of computer instructions, and a computer instruction for specifying said logical condition.

\* \* \* \* \*